United States Patent [19]

Morihisa

[11] 4,279,010
[45] Jul. 14, 1981

[54] DC-DC CONVERTER FOR SOLID STATE WATCHES

[76] Inventor: Mitsuo Morihisa, 29 Shibatsujiminami-cho, Nara-shi, Nara-ken, Japan

[21] Appl. No.: 905,293

[22] Filed: May 12, 1978

Related U.S. Application Data

[63] Continuation of Ser. No. 714,757, Aug. 16, 1976, abandoned.

[30] Foreign Application Priority Data

Aug. 14, 1975 [JP] Japan .................................. 50-99165

[51] Int. Cl.² ............................................ H02M 7/00
[52] U.S. Cl. ..................................................... 363/60
[58] Field of Search .......................... 58/23 BA, 50 R; 307/297; 363/59, 60

[56] References Cited

U.S. PATENT DOCUMENTS

| | | | |
|---|---|---|---|
| 3,818,484 | 6/1974 | Nakamura et al. | 363/60 |
| 3,824,447 | 7/1974 | Kuwabara | 363/60 |
| 3,942,047 | 3/1976 | Buchanan | 363/60 |
| 3,955,353 | 5/1976 | Astle | 363/60 |
| 3,975,671 | 8/1976 | Stoll | 363/60 |
| 4,000,412 | 12/1976 | Rosenthal et al. | 363/60 |

*Primary Examiner*—William M. Shoop

[57] ABSTRACT

A DC-DC converter for supplying a sufficient power voltage for solid state watches includes field-effect mode transistors operatively associated with charging and discharging paths of multi-stage capacitors which are primary components of the DC-DC voltage converter. The field-effect mode transistors are responsive to outputs from a level converter which in turn converts its input voltage to charge voltage at the last stage capacitor in response to enable signals. During the initial status of operation, the field effect mode switching transistors and the level converter are driven via the parasitic diodes of the field effect mode transistors, P-N junction type diodes provided for protecting the parasitic diodes from damage, or P-N junction type diodes provided exclusively for initiating purposes.

8 Claims, 11 Drawing Figures

DC-DC CONVERTER FOR SOLID STATE WATCHES

This application is a continuation of copending application Ser. No. 714,757, filed on Aug. 16, 1976, abandoned.

BACKGROUND OF THE INVENTION

1. Field of the Invention

The present invention pertains to a DC-DC converter.

2. History of the Prior Art

Figure 1:
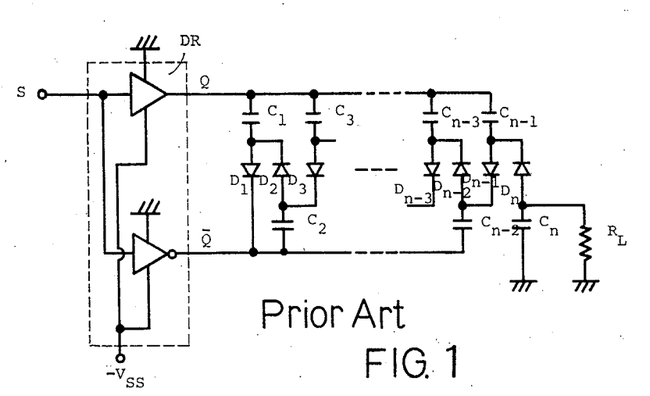
FIG. 1 is a circuit diagram showing a prior art DC-DC converter.

A typical prior art DC-DC converter has been proposed as disclosed in U.S. Pat. No. 3,818,484 issued June 18, 1974 to T. Nakamura et al., and assigned to the assignee of this application. As shown in FIG. 1, the DC-DC converter is of the Schenkel type wherein enable signals S of rectangular waveform are entered into a two-phase CMOS driver DR supplied with a DC power source voltage $-V_{ss}$ so that two-phase enable signals Q and $\overline{Q}$ are generated from the driver DR. By switching of diodes $D_1, D_2, \ldots D_n$, capacitors $C_1, C_2, \ldots C_n$ are charged with sequentially multiplied voltages. As a consequence, a DC voltage of $-nV_{ss}$ is developed at a load resistor $R_L$.

Nevertheless, a problem is experienced in the voltage multiplier employing the switching function of these diodes $D_1, D_2, \ldots D_n$, in that the conversion efficiency will decline markedly when the DC source voltage $-V_{ss}$ falls to an appreciable extent with reference to the forward voltage of the diodes $D_1, D_2, \ldots D_n$. For example, solid state wristwatches are powered with a relatively low voltage of about 1.75 V. In the case where the above shown circuit is utilized as a DC-DC converter for solid state watches, employment of conventional P-N junction type diodes is not accepted for practical use because their forward voltage can not be ignored as compared with the power source voltage with the result of remarkably reduced efficiency. However, employment of the Schottkey barrier type diodes is acceptable because of forward lower voltages than that of the conventional P-N junction type diodes. In this instance, high efficiency of about 80% is ensured when using the converter in solid state wristwatches.

Meanwhile, difficulties will be encountered for the Schottkey barrier type diodes (but not for the conventional P-N junction type) in incorporating the diodes $D_1, D_2, \ldots D_n$ into an IC or LSI semiconductor chip containing a timekeeping circuit. It is a requirement for solid state wristwatches to have low cost and a small amount of circuit components. However, Schottkey barrier type diodes have to be discrete components, separate from the IC and LSI semiconductor chip of the watch, which adds to the size and cost of the watch.

SUMMARY OF THE INVENTION

Accordingly, it is an object of the present invention to provide an improved DC-DC converter which enables circuit integration of all the constitutional components by utilization of field effect mode transistors (referred to as FET's hereinafter).

It is another object of the present invention to provide an improved DC-DC converter which can ensure a higher degree of efficiency as compared with a converter employing Schottkey barrier diodes.

It is still another object of the present invention to provide a temperature-compensated DC-DC converter which can overcome disadvantages that are experienced with converters employing Schottkey barrier type or the conventional P-N junction type diodes.

BRIEF DESCRIPTION OF THE DRAWING

A better understanding of the present invention may be had from a consideration of the following detailed description taken in conjunction with the accompanying drawing in which.

DETAILED DESCRIPTION OF THE INVENTION

Pursuant to the concept of the present invention, FET's and more particularly MOS type FET's are employed in a DC-DC converter for solid state wristwatches with power conserving features and the components which constitute the converter are all incorporated onto a complementary MOS semiconductor device. Therefore, the bipolar type of transistors are not preferred for the power conserving requirements of a wristwatch. While the present invention will be described with respect to employment of such MOS type FET's, it is equally applicable to other types of FET's.

The ON resistance $R_{ON}$ of P channel MOSFET's or N channel MOSFET's is at a minimum if there is agreement between the substrate potential and the source potential or the drain potential. Assuming that a potential difference is developed between the gate and the substrate which is effective to generate a channel therebetween, if the difference between the substrate potential and the source potential or the drain potential is relatively great, the possibility is created that the FET substantially turns on due to an increase in the ON resistance $R_{ON}$. This is an objectionable event for switching functions. Therefore, a pair of switching elements, that is, a parallel connected P channel MOSFET and an N channel MOSFET are preferred as a switching function element of which the source potential or the drain potential is not fixed. In this case, as the respective ON resistances $R_{ON}$ are connected in parallel, the combined resistance of parallel resistances $R_{ON}$ is maintained at a relatively stable low value even when the source potential or the drain potential varies.

Figure 2:
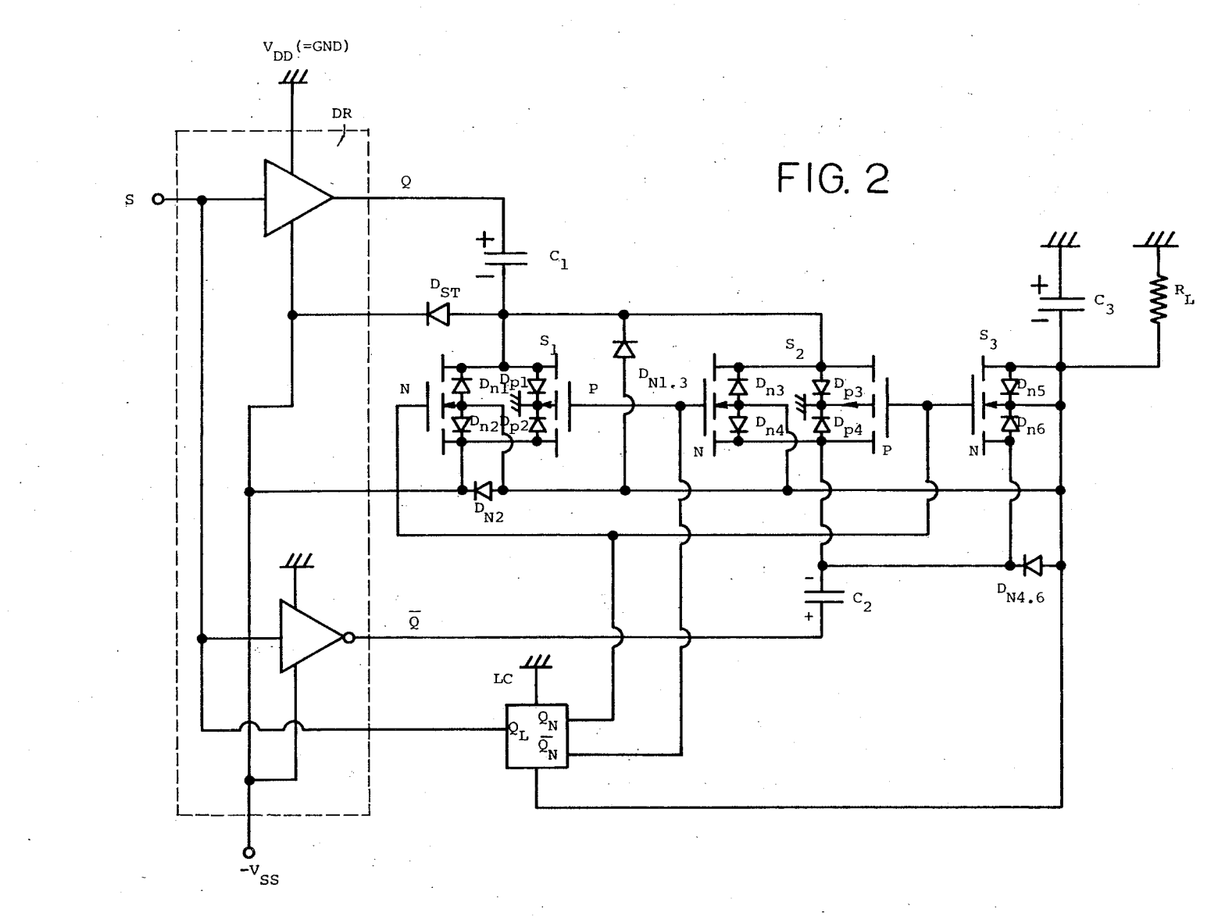
FIG. 2 is a circuit diagram showing one preferred form of the present invention.

FIG. 2 shows a complementary MOS DC-DC converter of the Schenkel type which multiplies a DC voltage by three by utilization of the switch pair comprising a parallel connected P channel MOSFET and an N channel MOSFET. This may be termed a three-stage voltage multiplier.

Although the driver circuit DR is of the same structure as the prior art arrangement shown in FIG. 1, the switch pair $S_1$ corresponds to the diode $D_1$ of FIG. 1, the switch pair $S_2$ corresponds to the diode $D_2$ and the switch $S_3$ comprising only an N channel MOSFET corresponds to the diode $D_3$. More particularly, each of the switch pairs $S_1$ and $S_2$ is adapted such that both source electrodes and both drain electrodes of the P channel MOSFET and the N channel MOSFET are respectively connected in common and both the substrates thereof are coupled with $V_{DD}(=GND)$ and one terminal of the last stage capacitor $C_3$, respectively. The level converter LC is supplied with power from one terminal of the capacitor $C_3$, that is the output voltage $V_{OUT}$ of the converter and receives as a clock input $Q_L$, the enable signals S from the driver circuit DR. The level converter LC provides the output signal $Q_H$ and $\overline{Q_H}$ which in turn are respectively applied to the gates of the N channel MOSFET of the switch pair $S_1$, the P channel MOSFET of the switch pair $S_2$ and the N channel MOSFET of the switch $S_3$ and the gates of the P channel MOSFET of the switch $S_1$ and the N channel MOSFET of the switch $S_2$. As a result, the switches $S_1$, $S_2$ and $S_3$ operate in a manner to be described with reference to FIGS. 3 and 4.

Figure 3:
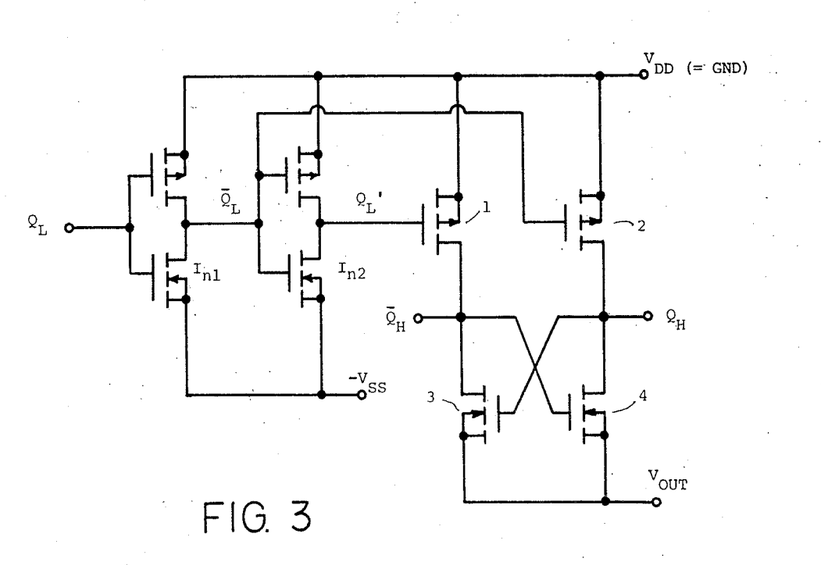
FIG. 3 is a circuit diagram showing details of the primary portion of the circuit of FIG. 2.
Figure 4:
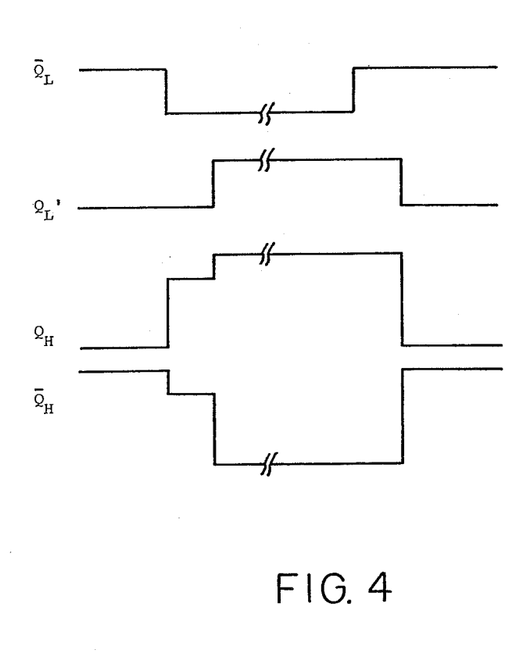
FIG. 4 is a timing diagram showing waveforms of various signals which occur in the circuit of FIG. 3.

The details of the level converter LC are illustrated in a circuit diagram of FIG. 3 and the timing relationship thereof is illustrated in a timing diagram of FIG. 4. Upon receipt of the clock signal $Q_L$ the first stage CMOS inverter $In_1$ produces the reversal signal $\overline{Q_L}$. Simultaneously, the in-phase signals $Q_L'$ somewhat delayed are developed at the second-stage CMOS inverter $In_2$. These signals are within a voltage range of $V_{DD}$ (=CND) through $-V_{SS}$. The in-phase signal $Q_L'$ is applied to the gate of a first P channel MOSFET 1 and the out-phase signal $\overline{Q_L}$ is applied to the gate of a second P channel MOSFET 2. The first P channel MOSFET 1 and a second P channel MOSFET 2 are connected via the third N channel MOSFET 3 and fourth N channel MOSFET 4 between $V_{DD}$ (=GND) and $V_{OUT}$. The outputs $\overline{Q_H}$ and $Q_H$ are supplied from the resulting state of the gates of the third and fourth N channel MOSFET's 3 and 4.

It is assumed that the out-phase signal $\overline{Q_L}$ is $V_{DD}$ (=GND) and in-phase signal $Q_L'$ is $-V_{SS}$. Then the first P channel MOSFET 1 is ON and the second P channel MOSFET 2 is OFF. The output signal $\overline{Q_H}$ is $V_{DD}(=GND)$, thereby rendering the fourth N channel MOSFET 4 ON. When the fourth N channel MOSFET 4 is ON, the output signal $Q_H$ assumes the same potential as $V_{OUT}$ to force the third N channel MOSFET 3 into its OFF state.

When the reverse or out-phase signal $\overline{Q_L}$ is $-V_{SS}$ the second P channel MOSFET 2 is ON and also the third N channel MOSFET 3 is ON. In other words all the MOSFET's 1, 2, 3 and 4 are placed at the ON state.

If the ON resistances of the first and second P channel MOSFET's 1 and 2 are sufficiently small as compared with that of the third and fourth N channel MOSFET's 3 and 4, the output signal $Q_H$ will be reversed to a value approximating $V_{DD}$ (=GND) and $\overline{Q_H}$ will be held at a value somewhat lower than $V_{DD}$ (=GND).

When the in-phase signal $Q_L'$ is $V_{DD}(=GND)$, the first P channel MOSFET 1 is OFF and the output signal $Q_H$ is provided as $V_{OUT}$. Under these circumstances, the fourth N channel MOSFET 4 turns OFF so that the output signal $Q_H$ is absolutely equal to $V_{DD}$ (=GND). When the out-phase signal $\overline{Q_L}$ is $V_{DD}$ (=GND), the second P channel MOSFET 2 is OFF and the output signal $Q_H$ is held at $V_{DD}$ due to the capacitive components of the second P channel MOSFET 2 and the fourth N channel MOSFET 4 both in the OFF state. By the output signal $Q_H$, the third N channel MOSFET 3 is held at the ON state. When the in-phase signal $Q_L'$ is $-V_{SS}$, the first P channel MOSFET 1 turns ON to place the output signal $\overline{Q_H}$ adjacent $V_{DD}(=GND)$ and turn ON the fourth N channel MOSFET 4. When this occurs, the output signal $Q_H$ is $V_{OUT}$ so that the third N channel MOSFET 3 is OFF and the output $\overline{Q_H}$ is equal to $V_{DD}$ (=GND).

In this way, the level converter LC serves to convert the signals of the voltage range from $V_{DD}(=GND)$ to $-V_{SS}$ into signals of the voltage range from $V_{DD}$ (=GND) to $V_{OUT}$. It will be obvious from FIG. 2 that the output signal Q of the driver DR is in phase with the output signal $Q_H$ of the level converter LC and the output signal $\overline{Q}$ of the driver DR is in phase with the output signal $\overline{Q_H}$ of the level converter DR.

It is of importance for the above discussed DC-DC converter employing the MOSFET switching elements that the various portions of the circuit are supplied with desired voltages in wuch a way as to enable the normal switching mode during the transient state from the initial state up to the stable start. Needless to say, the DC-DC converter does not provide a multiplied voltage unless it is energized. However, it is difficult to supply the DC-DC converter with such a high energizing voltage from outside. In the given example, effective utilization of starting diodes such as parasitic diodes of the MOSFET's permits self started operation of the DC-DC converter.

In FIG. 2, $D_{n1}$, $D_{n2}$, ... $D_{n6}$ and $D_{p1}$, $D_{p2}$, ... $D_{p6}$ contained within the switches $S_1$, $S_2$ and $S_3$ are such parasitic diodes of the MOSFET's. Since P-N junction regions occupy a relatively small area in the fabrication of MOSIC's, there occurs the possibility of causing damage to the parasitic diodes when large current flows therethrough in the forward direction. Therefore, if necessary, protecting diodes will be connected in parallel with the parasitic diodes. To this end, in the circuit illustrated in FIG. 2, the protecting diodes $DN_{1,3}$, $DN_2$ and $DN_{4,6}$ are connected in parallel with these parasitic diodes. It will be noted that the diode $DN_{1,3}$ serves to protect the two parasitic diodes $D_{n1}$ and $D_{n3}$ and the diode $DN_{4,6}$ serves to protect the two parasitic diodes $D_{n4}$ and $D_{n6}$. The protection diodes may be of the conventional P-N junction type since they serve merely the purposes of protecting the parasitic diodes from damage. The diode $D_{ST}$ is a special purpose diode for starting the energization of the DC-DC converter and is connected betwen the junction of the capacitor $C_1$ and the switch $S_1$ and the source voltage $-V_{SS}$.

Now when the source voltage $-V_{SS}$ is known and the output signal Q of the driver circuit DR is $V_{DD}$ (=GND), the capacitor $C_1$ is charged via the starting diode $D_{ST}$ to about $-V_{SS}$. At this time, though the capacitor $C_3$ is charged via the parasitic diode $D_{n2}$ and the protecting diode $DN_2$ of the switch $S_1$, from the source voltage $-V_{SS}$, the resulting charge voltage is somewhat lower than $|-V_{SS}|$ due to the forward voltage drop of these diodes. In other words, taking the forward voltage drop $\alpha$ into account, the capacitor $C_3$ is charged to $|-V_{SS}|-|\alpha|$. The charged voltage $|-V_{SS}|-|\alpha|$ is supplied as $V_{OUT}$ to the level converter LC. If the threshold level voltage $|-V_{th}|$ of the MOSFET's contained within the level converter LC, the pair switches $S_1$, $S_2$, etc. is chosen to be sufficiently low as compared with $|-V_{SS}|-|\alpha|$ in designing the DC-DC converter, the output signals $Q_H$ and $\overline{Q}_H$ of the level converter LC will be respectively $|-V_{SS}|-|\alpha|$ and $V_{DD}$ (=GND). The result is that the switch $S_1$ turns ON to force the diode $D_{ST}$ into the shunt state and charge the capacitor $C_1$ to $-V_{SS}$. If the output signals Q and $\overline{Q}$ of the driver DR vary thereafter, the charge voltage of the capacitor $C_3$ will become higher than $|-V_{SS}|$ and therefore reach a value sufficient for the energization of the level converter LC, the switches $S_1$, $S_2$, $S_3$, etc. The circuit arrangement will be shifted to the normal state through the transient voltage multiplication state. In this case, the circuit arrangement can be rendered operative without aid of the parasitic diodes $D_{n1}$, $D_{n3}$ and their protecting diode $DN_{1,3}$.

However, in the event that the impedance of the external load $R_L$ is small and the forward voltage drop due to the parasitic diode $D_{n2}$ and the protecting diode $DN_2$ is large, the charge voltage $|-V_{SS}|-|\alpha|$ of the capacitor $C_3$ will be lower than the threshold level voltage $|-V_{th}|$ of the MOSFET's and hence the level converter LC and the switches $S_1$, $S_2$ and $S_3$ will fail to start their performances. In this instance, the circuit arrangement will be energized in the following manner.

When the source voltage $-V_{SS}$ is supplied and the output signal Q of the driver DR is $V_{DD}$ (=GND), in any case the capacitor $C_1$ will be charged to the voltage of about $|-V_{SS}|$ regardless of the ON or OFF state of the switch $S_1$. Under these circumstances, the output signal Q of the driver DR is $-V_{SS}$ so that the capacitor $C_3$ is charged via the parasitic diode $D_{n1}$ of the switch 1, the parasitic diode $D_{n3}$ of the switch 2 and their protecting diode $DN_{1,3}$ to the voltage $|-2V_{SS}|-|\beta|$ wherein $\beta$ is the forward voltage drop of the above named diodes plus the counterpart of the starting diode $D_{ST}$. Generally, for the conventional P-N junction type diode, the forward voltage is about 0.6 V and the relationship set forth below is established when the source voltage $-V_{SS}$ is below $-1.0$ V:

$$|-2V_{SS}|-|\beta|>|-V_{SS}|-|\alpha|$$

when the charge voltage $|-2V_{SS}|-|\beta|$ of the capacitor $C_3$ is above the threshold level voltage $|-V_{th}|$ of the MOSFET's in the level converter LC, the switches $S_1$, $S_2$ etc., the switch $S_2$ is turned ON. Thereafter, the level converter LC and the switches $S_1$, $S_2$, $S_3$ are completely operable.

While the foregoing sets forth the case when the external load $R_L$ has low impedance, the above described operation will be equally expected with the threshold level voltage $|-V_{th}|$ of the MOSFET's of the level converter LC and the switches $S_1$, $S_2$, $S_3$. In this instance, good yield is attained in the fabrication of MOSIC's.

As discussed above, when the source voltage $-V_{SS}$ is supplied and the output signal Q of the driver DR is $V_{DD}$ (=GND), the capacitor $C_3$ is charged to $|-V_{SS}|-|\alpha|$. And when the output signal Q of the driver DR is $-V_{SS}$, the capacitor $C_3$ is charged to $|-2V_{SS}|-|\beta|$. Subsequent to this, the level converter LC starts to operate and the voltage multiplying performances are initiated, due to the switching of the switches $S_1$, $S_2$ and $S_3$. Under these circumstances, there is created the possibility that a large amount of forward current will flow through the parasitic diodes $D_{n4}$ and $D_{n6}$ of the switches $S_2$ and $S_3$, because a voltage higher than $|-2V_{SS}|-\beta|$ develops across the capacitor $C_2$ for a short period of time. The protecting diode $DN_{4,6}$ connected in parallel with these parasitic diodes serves to shunt the forward current for protecting purposes. Under the normal state, the parasitic diodes and the protecting diodes are reverse-biased and hence inoperative due to the sufficiently small ON resistances of the switches $S_1$, $S_2$, $S_3$.

Figure 5:
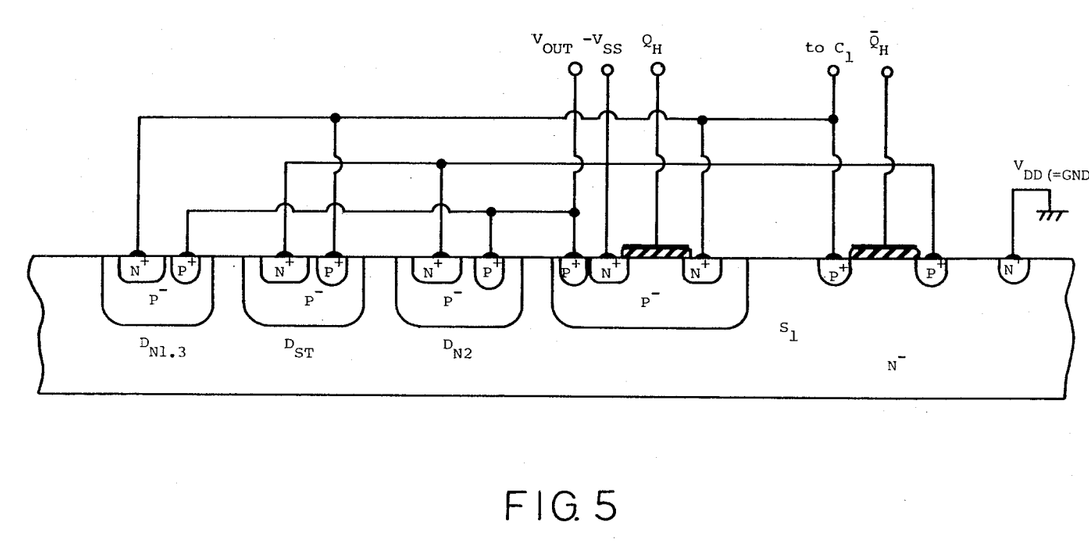
FIG. 5 is a cross sectional view showing the layout of an integrated circuit semiconductor device of the circuit of FIG. 2.

The layout of an integrated circuit device which incorporates the circuit arrnagement of FIG. 2 into a single semiconductor chip is illustrated in FIG. 5 wherein only the switch pair $S_1$, the starting diode $D_{ST}$ and the protecting diodes $DN_2$, $DN_{1,3}$ are depicted for the purpose of illustration. It will be clear from FIG. 5 that P-N junction area of the parasitic diodes provided at the source regions and the drain regions of the N channel MOSFET and the P channel MOSET forming the switch $S_1$ is extremely small. Therefore, if the P-N junction area is selected widely as viewed from the case of the protecting diodes $DN_2$, $DN_{1,3}$ in the fabrication of the N channel MOSFET and the P channel MOSFET, the permissible amount of current in MOSFET'is greatly increased thereby to overcome the necessity of providing the protecting diodes $DN_2$ and $DN_{1,3}$. In other words, the performances can be started with aid of only the parasitic diodes. In this drawing a P+ region and an N+ region are provided within an N− substrate for the purpose of merely leading respective electrodes.

Although in the above illustrated embodiment the switch pair comprising P channel and N channel MOSFET's is employed as the switching element, a single MOSFET may be used provided that the potential difference between the substrate and the drain or the source does not vary when in the ON state. An example of the single MOSFET switching element is illustrated in FIGS. 6 and 7 wherein FIG. 6 shows a X3 voltage multiplier and FIG. 7 shows a X2 voltage multiplier.

Figure 6:
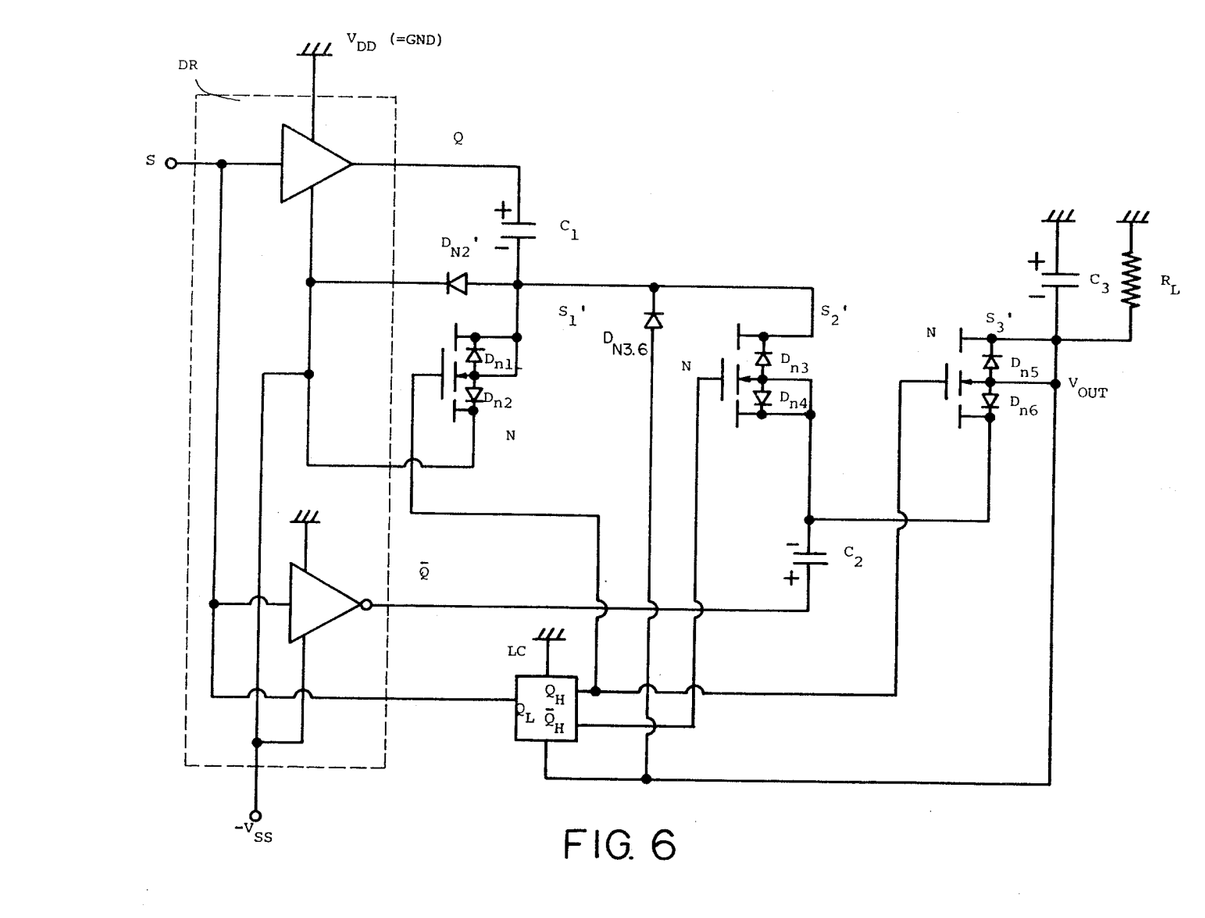
FIG. 6 is a circuit diagram showing another preferred form of the present invention.

In FIG. 6, the switches $S_1'$, $S_2'$, and $S_3'$ each comprises an N channel MOSFET of which the drain and the substrate are commonly connected. The diodes $DN_2'$ and $D_{N\,3,6}$ perform the same functions as the starting diode $D_{ST}$ and the protecting diode $DN_{1,3}$ of FIG. 2, and are connected in parallel with a series combination of the parasitic diode $D_{n2}$ of the switch $S_1'$ and the parasitic diodes $D_{n4}$ and $D_{n6}$ of the switches $S_2'$ and $S_3'$. They also facilitate the protection of these parasitic diodes. The gates of the switches $S_1'$, $S_2'$ and $S_3'$ receive the output signals of the level converter LC which is suppled with the output voltage $V_{OUT}$, that is, the charge voltage of the capacitor $C_3$. The switches $S_1'$, $S_2'$, etc. are inclined to have gate potentials which are negative with respect to the substrate when the are in the OFF state. However, the possibility of causing damage to MOSFET is not customarily experienced in this case.

Figure 7:
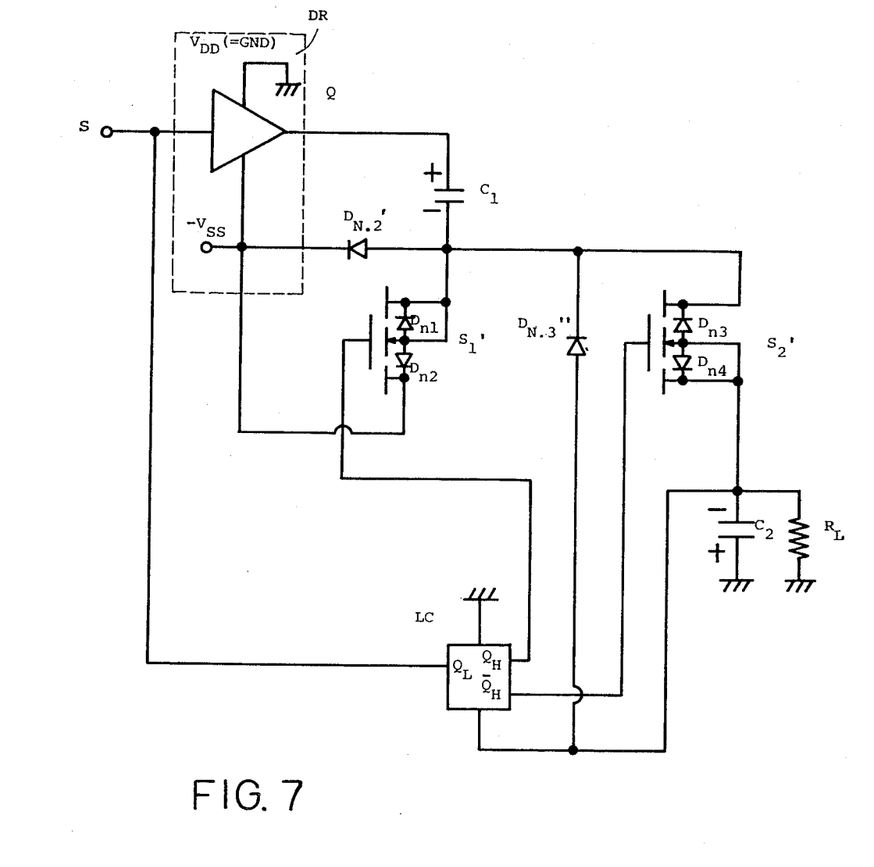
FIG. 7 is a circuit diagram showing still another form of the present invention.

The X2 multiplier of FIG. 7 resembles substantially that of FIG. 6. In the example shown herein, the driver DR has only to provide the output signal Q and the diode $D_{N,3'}$ serve to protect the parasitic diode $D_{N,3}$ of the switch $S_2'$ from being damaged. In the case of the X2 multiplier, the substrate and the gate of the N channel MOSFET are at $-2V_{SS}$ and therefore held at the same potential when the switch $S_1$ is OFF. To solve the gate damage problem in the MOSFET switching elements, the pair switch as shown in FIG. 2 is needed thereby permitting the substrate and the gate to be held at the same potential. It will be understood that the last stage switch such as the switch $S_3$ of FIG. 2 may comprise a single MOSET since the substrate and the gate in the OFF state are maintained at the same level.

Figure 8:
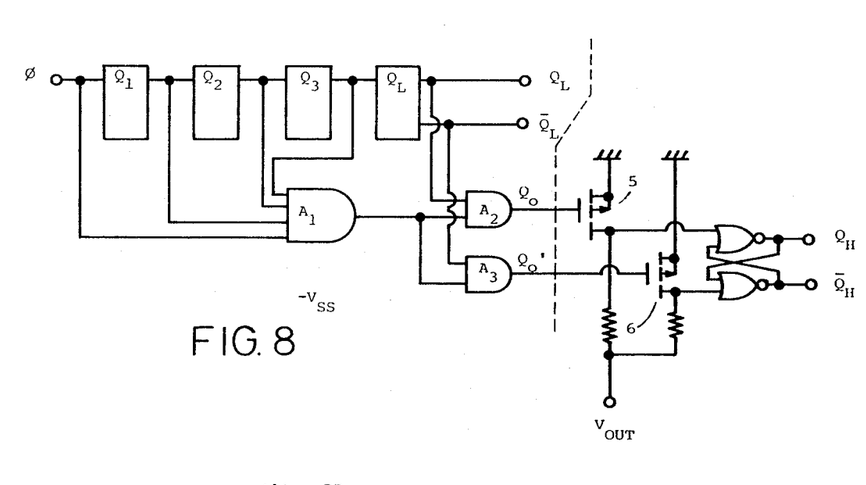
FIG. 8 is a circuit diagram showing an example of a level converter.
Figure 9:
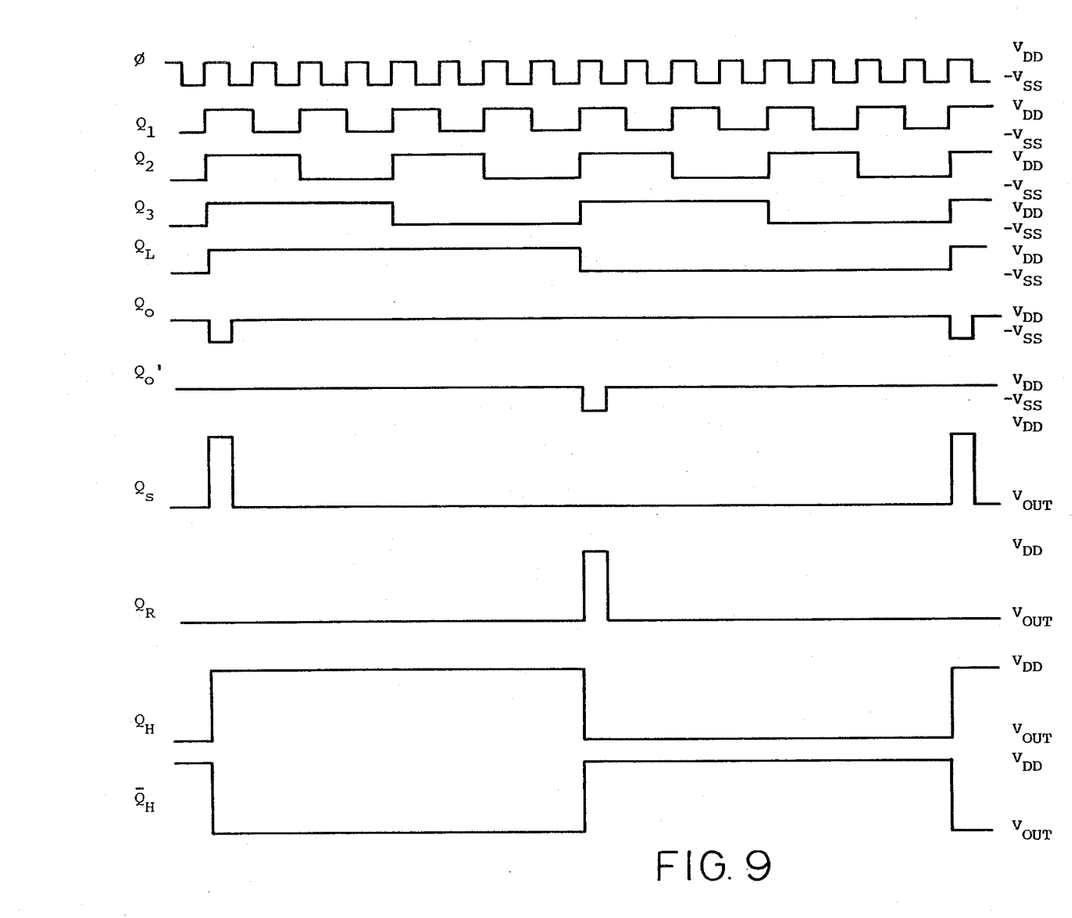
FIG. 9 is a timing diagram showing waveforms of various signals which occur in the circuit of FIG. 8.

The level converter LC may take another form illustrated in FIG. 8. FIG. 9 depicts various signals which occur in the circuit of FIG. 8. A frequency divider DV of four stage T type flip-flop series ad AND gates $A_1$, $A_2$ and $A_3$ are supplied with the source voltage $-V_{SS}$, whereas P channel MOSFET's 5 and 6 and a flip flop FF are supplied with the charge voltage $V_{OUT}$ of the last stage capacitor (e.g., the capacitor $C_3$ in FIG. 2). Consequently, the power voltage $-V_{SS}$ is of an extremely limited pulse width as clear from the output signals $Q_O$ and $\overline{Q}_O$ thereby conserving power which will be discharged from resistors $R_1$ and $R_2$ connected in series with the P channel MOSFET's 5 and 6 energized by $V_{OUT}$. The output signals $Q_L$ and $\overline{Q}_L$ of the divider DV may be applied to the driver.

Figure 10:
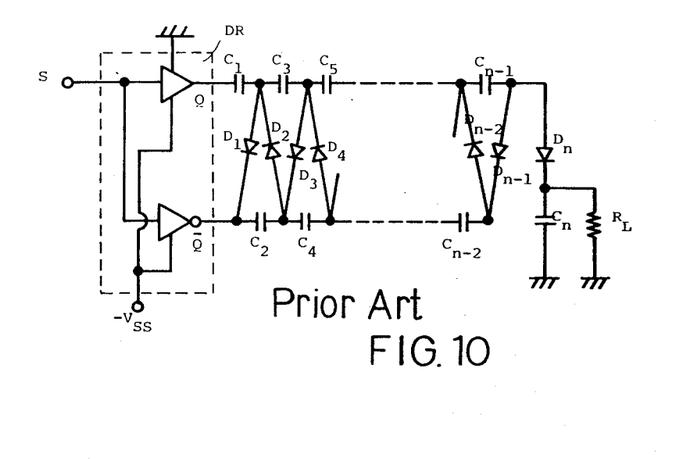
FIG. 10 is a circuit diagram showing another example of prior art DC-DC converter.
Figure 11:
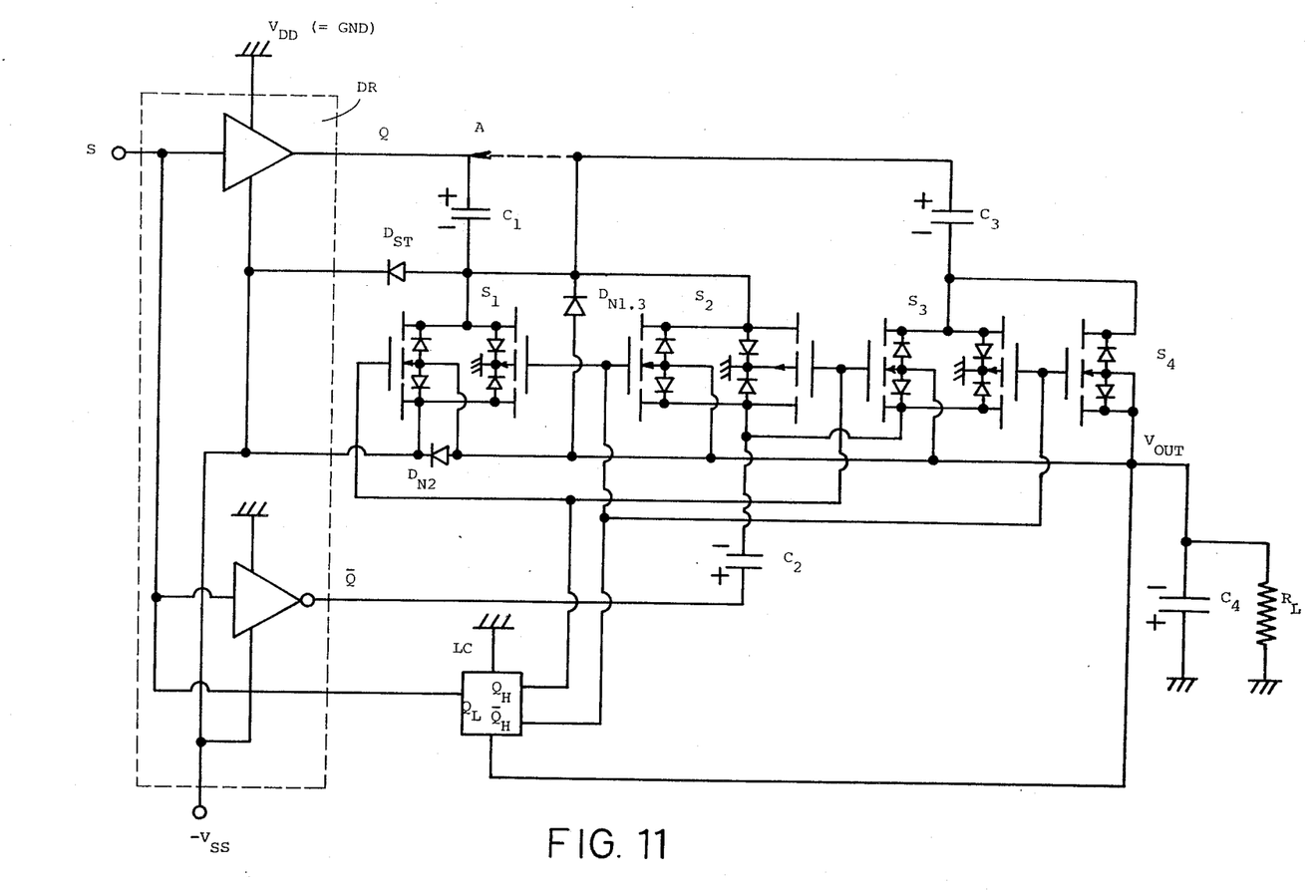
FIG. 11 is a circuit diagram showing another preferred form of the present invention which corresponds to the circuit of FIG. 10.

Although the concept of the present invention has been explained with respect to the Schenkel type DC-DC converter, the present invention is equally applicable to the Cockcroft type as shown in FIG. 10. Both types of DC-DC converters may be implemented with the substantially same configuration for up to X3 multipliers. For an X4 or more multipliers, the Schenkel type DC-DC converter of FIG. 1 can be modified into the Cockcroft type by connecting the third-stage of higher-stage capacitors in series with the two-stage preceding capacitors. For example, as shown in FIG. 11, for an X4 multiplier, the third stage capacitor $C_3$ is connected in series with the first stage capacitor $C_1$ thereby to enable modification into the Cockcroft type. In FIG. 11, a connection defined by the denoted line A illustrates the X4 Schenkel type.

Although there has been described above a specific arrangement of the DC-DC converter in accordance with the invention for the purpose of illustrating the manner in which the invention may be used to advantage, it will be appreciated that the invention is not limited thereto. Accordingly, any modifications, variations or equivalent arrangements which may occur to those skilled in the art should be considered to be within the scope of the invention.

What is claimed is:

1. A DC-DC converter having a C-MOS driver stage and a voltage multiplier stage including a plurality of capacitors, comprising:

field effect mode switching transistor means in series with the respective capacitors of said voltage multiplier for controlling the charging and discharging of the respective capacitors in response to control signals applied to said field effect mode switching transistors;

level converter means for providing control signals applied to said field effect mode switching transistors in response to enable signals applied to said C-MOS driver stage and the highest voltage appearing at the last stage of said voltage multiplier; and bypass means for providing charging and discharging path for the respective capacitors through parasitic diodes within said field effect mode switching transistor means, said bypass charging and discharging paths not including the circuit path through the gate, source, and drain of said field effect mode switching transistor means, said bypass means being operable from the initial start-up of said DC to DC converter up to the stable state at the starting thereof.

2. The DC-DC converter as recited in claim 1, wherein additional diode means are provided in parallel with said parasitic diodes for protecting the parasitic diodes from large instantaneous current.

3. The DC-DC converter as recited in claim 1, wherein said switching transistor means includes single FETs with the substrate thereof coupled to the source or drain thereof, whereby the ON resistance of the switching transistors is minimized.

4. The DC-DC converter as recited in claim 1, wherein said switching transistor means includes a complementary pair of P-channel and N-channel field effect mode transistor switches.

5. The DC-DC converter as recited in claim 4, wherein the substrate of the P-channel transistor is grounded and the substrate of the N-channel transistor is biased at the highest potential appearing at the last stage of said voltage multiplier, whereby the ON resistance of said switching transistor means is minimized.

6. The DC-DC converter as recited in claim 5, wherein a diode is provided for starting the energization of the DC-DC converter and coupled to both the capacitor and the complementary pair switch of the first stage of the DC-DC converter.

7. The DC-DC converter as recited in claim 1, wherein the charged voltage at the last stage capacitor is supplied for a timekeeping circuit.

8. The DC-DC converter as recited in claim 1, wherein the field effect mode transistors and the level converter are integrated.

* * * * *

UNITED STATES PATENT AND TRADEMARK OFFICE
CERTIFICATE OF CORRECTION

PATENT NO. : 4,279,010
DATED : July 14, 1981
INVENTOR(S) : Mitsuo MORIHISA

It is certified that error appears in the above—identified patent and that said Letters Patent is hereby corrected as shown below:

Page 1 of the Patent, between category [76] Inventor, and category [21] Appln. No. 905,293, insert the following category:

--[73] Assignee: Sharp Kabushiki Kaisha, Osaka, Japan--.

Signed and Sealed this

Thirtieth Day of March 1982

[SEAL]

Attest:

GERALD J. MOSSINGHOFF

Attesting Officer     Commissioner of Patents and Trademarks